US009862401B2

(12) United States Patent
Wuerstl

(10) Patent No.: US 9,862,401 B2
(45) Date of Patent: Jan. 9, 2018

(54) COLLAPSIBLE PUSHCHAIR FRAME OR DOLL'S PUSHCHAIR FRAME

(71) Applicant: CURT WUERSTL VERMOEGENSVERWALTUNGS-GMBH & CO. KG, Hof (DE)

(72) Inventor: Jan-Stefan Wuerstl, Regnitzlosau (DE)

(73) Assignee: CURT WUERSTL VERMOEGENSVERWALTUNGS-GMBH & CO. KG (DE)

( * ) Notice: Subject to any disclaimer, the term of this patent is extended or adjusted under 35 U.S.C. 154(b) by 0 days.

(21) Appl. No.: 15/127,359

(22) PCT Filed: Mar. 17, 2015

(86) PCT No.: PCT/EP2015/055519
§ 371 (c)(1),
(2) Date: Oct. 7, 2016

(87) PCT Pub. No.: WO2015/140146
PCT Pub. Date: Sep. 24, 2015

(65) Prior Publication Data
US 2017/0072983 A1 Mar. 16, 2017

(30) Foreign Application Priority Data
Mar. 17, 2014 (DE) .................. 20 2014 101 200

(51) Int. Cl.
*B62B 7/08* (2006.01)
*B62B 7/06* (2006.01)
*B62B 9/00* (2006.01)

(52) U.S. Cl.
CPC ............... *B62B 7/08* (2013.01); *B62B 7/062* (2013.01); *B60Y 2400/411* (2013.01); *B62B 7/06* (2013.01); *B62B 9/005* (2013.01); *B62B 2205/20* (2013.01)

(58) Field of Classification Search
CPC .. B62B 7/08; B62B 7/062; B62B 7/06; B62B 7/064; B62B 2205/20; B62B 2205/003; B62B 9/005; B60Y 2400/411
(Continued)

(56) References Cited

U.S. PATENT DOCUMENTS

| 4,529,219 A | 7/1985 | Shamie | 280/642 |
| 7,077,420 B1 | 7/2006 | Santoski | 280/642 |

(Continued)

FOREIGN PATENT DOCUMENTS

| CN | 201457448 | 5/2010 |
| CN | 202463877 | 10/2012 |

(Continued)

OTHER PUBLICATIONS

International Search Report and Written Opinion with English translation issued in corresponding application No. PCT/EP2015/055519, dated Jul. 3, 2015 (18 pgs).

(Continued)

*Primary Examiner* — John D Walters
(74) *Attorney, Agent, or Firm* — Hayes Soloway P.C.

(57) ABSTRACT

A collapsible pushchair frame or doll's pushchair frame, includes: two lateral frame bars with push bars and front wheel arrangements on the frame bars; two lateral support struts, each of which is pivotably fastened, by a respective joint to a frame bar, at a distance from the lower end of the bar and which have bearings for rear wheels on their lower ends lying towards the rear in relation to the articulation points; and a seat insert or reclining insert. At least one stabilizing rod is designed as a safety rod and divided by a knee joint. An adjusting device includes an actuating element (21) arranged under the insert in the pushchair frame is coupled to at least one part of the at least one stabilizing rod, the actuating element being used to at least raise the (Continued)

corresponding front part of the stabilizing rod (13a, 13b) comprising the knee joint (18).

16 Claims, 2 Drawing Sheets

(58) Field of Classification Search
USPC .............. 280/642, 647, 648, 650, 657, 658
See application file for complete search history.

(56) References Cited

U.S. PATENT DOCUMENTS

| | | | |
|---|---|---|---|
| 8,408,580 B2* | 4/2013 | Liao ...................... | B62B 7/086 280/642 |
| 8,459,665 B2* | 6/2013 | Sellers .................... | B62B 7/08 280/47.38 |
| 9,421,991 B2* | 8/2016 | Driessen ................. | B62B 7/08 |
| 2011/0291388 A1 | 12/2011 | Sellers et al. ............. | 280/647 |

FOREIGN PATENT DOCUMENTS

| | | |
|---|---|---|
| DE | 202007011937 | 1/2008 |
| DE | 202009014572 | 3/2010 |
| DE | 102012111060 | 5/2013 |
| DE | 202013103448 | 11/2013 |
| EP | 1281595 | 2/2003 |
| EP | 1967439 | 9/2008 |
| WO | WO2010/040644 | 4/2010 |
| WO | WO2012/027795 | 3/2012 |
| WO | WO2013/092600 | 6/2013 |

OTHER PUBLICATIONS

International Preliminary Report on Patentability issued in corresponding application No. PCT/EP2015/055519, dated Sep. 20, 2016 (7 pgs).

International Preliminary Report on Patentability (w/translation) issued in application No. PCT/EP2015/055519, dated Sep. 29, 2016 (16 pgs).

* cited by examiner

COLLAPSIBLE PUSHCHAIR FRAME OR DOLL'S PUSHCHAIR FRAME

BACKGROUND OF THE INVENTION

The invention relates to a collapsible baby carriage or doll's pram chassis, comprising at least two lateral chassis posts, which in the erected state extend at an inclination from the bottom at the front rearwardly in upward direction, with push bars provided thereat at the upper side in prolongation and a front wheel arrangement, which is provided at the lower ends or at a bridge part connecting these, with front wheels, two lateral support struts, which are pivotably attached to the chassis posts at a spacing from the lower ends thereof each by way of a respective joint and which have bearings for rear wheels at their lower ends, these ends being offset rearwardly relative to the pivot points, and a seat insert or lying-down insert arranged in the chassis, wherein the inclined chassis posts and the support struts are arranged to be pivotable relative to one another by way of a respective joint and at least one stabilising rod is pivotably provided between the inclined chassis posts and the support struts or at bridge elements respectively connecting these.

A collapsible baby carriage or doll's pram chassis of the kind according to category is known from EP 1 281 595 A1. The pivotable support struts are held in the erected position by a U-shaped stiffly-connecting frame which consists of two longitudinal struts and a bridge part connecting the rear ends and which is arranged below the seat insert or lying-down insert between the chassis posts. The front ends of the longitudinal struts are articulated in the lower region of the carriage chassis to the chassis posts or to a connecting strut connecting these. Two coupling rods, which are pivotably attached to the longitudinal struts between the chassis posts and the support struts on the one hand and to the support struts on the other hand in each instance at the same height, produce—when the connecting rear yoke is pulled up—a movement transformation and a pivotation of the support struts towards one another in the direction of the chassis posts and conversely. A similarly constructed chassis is additionally known from DE 20 2007 011 937 U1.

Collapsible baby carriage chassis of the kind according to category are additionally known from DE 20 2013 103 448 U1, DE 20 2009 014 572 U1, EP 1 967 439 A2, WO 2012/027795 A1, CN 202463877 U and CN 201457448 U.

DE 10 2012 111 060 A1 discloses a collapsible child transport device, in which a seat part has openings by way of which a belt acts on locking devices, which are arranged in the seat part, for raising connecting rods.

WO 2010/040644 A1 discloses a baby carriage, in which two connecting rods can be raised by way of a belt.

The known solutions enable collapsing of the baby carriage chassis by single-handed triggering, in which the stabilising rods or the frame is or are merely raised and then a relative pivotation of the support struts with respect to the chassis posts is made possible. This can have the consequence of collapse of the baby carriage due to unintended actuation. Standard EN 1888 applicable to baby carriages prescribes that at least two mutually independent hand grips are essential in order to trigger collapse of the baby carriage. As a result, unintended folding of the baby carriage with the child lying or seated therein shall be avoided. The child cannot be injured by moving parts of the joint.

The invention has the object of so developing a collapsible baby carriage or doll's pram chassis according to category that unintended collapsing of the carriage chassis with a small child seated or lying in the insert is not possible and collapsing can be triggered only if the child itself is no longer present in the baby carriage insert. However, the invention shall also be usable in the same way on a doll's pram chassis.

SUMMARY OF THE INVENTION

The invention is distinguished by the fact that the stabilising rod is constructed as a securing rod and divided by way of toggle joint, which bends when the inclined chassis posts and the support struts are led together and displaces upwardly and in the extended state forms erection securing means of the carriage chassis, that an adjusting device is coupled by at least a part of the at least one stabilising rod with an actuating element which is arranged in the carriage chassis below the insert and by way of which the corresponding part of the stabilising rod is at least raisable by the toggle joint, wherein the actuating element is so arranged below the insert that it is accessible for functional control only after pivoting up of a seat part of the insert or by removal of the insert.

The securing rods can be pivoted in the lower end region to the chassis posts on the one hand and on the other hand to the rearward support struts connected therewith. The securing rod can be present at one side, thus only once, or, however, at both sides of the chassis frame so as to achieve a higher degree of stability of the chassis in erected state. However, a direct connection is not absolutely necessary. Rather, the coupling of a securing rod or two securing rods to bridge elements can also be provided, which elements respectively connect the chassis posts on the one hand and the support struts on the other hand. These bridge elements can be simple connecting posts or, however, also shaped bridge elements at which fastening straps are provided, to which the ends of the stabilising rods are pivotably screw-connectible. The stabilising rod itself has a toggle joint at a defined location and thus divides the stabilising rod or securing rod into two sections.

If several stabilising rods are provided, it will be obvious that the toggle joints are to be mounted in alignment with a pivot axis so that the parts are equally moved when the toggle joints are raised upwardly. The toggle joints can be mounted approximately in the centre of the stabilising rod, but they can also be provided laterally offset, i.e. arranged off-centre. The position respectively depends on the design of the chassis and the lengths of the chassis posts and support struts as well as on the construction of the joints by way of which the support struts are attached to the chassis posts.

The toggle joints are in addition constructed so that in the extended position of the parts it is not possible to force through in downward direction. For that purpose, a projection can be provided at one part, which projection extends over the toggle joint and engages the other part. Additional securing means, for example push securing means, can be provided so as to prevent the toggle joints from being able to be raised. Such push securing means extends over the joint and is displaceably mounted on one of the parts. However, in order to be able to raise the toggle joints in upward direction the securing means has to be displaced or moved until the joints are free again.

It will be apparent that when a lifting force is exerted on the two parts or on one part of the divided stabilising rod this leads to raising of the toggle joints. A lifting or pulling device thus has to be provided in the carriage chassis so as to be able to raise the toggle joints in desired manner so that the support struts can pivot in the direction of the chassis posts for collapsing of the carriage chassis. Through the coupling by way of the divided stabilising rods a movement transformation takes place until the chassis posts and the support struts come into contact with one another or, in the case of a lateral offset, lie adjacent to one another insofar as this position is made possible by the front and rear wheels, which simultaneously also pivot towards one another. If the wheels are at the same axial spacing, then the diameters of the wheels, which then hit against one another, determine the minimum folding-in angle for collapse of the chassis.

A feature according to the invention is that the control element of the adjusting device, namely the lifting device or the pulling device, cannot be operated directly, but is so arranged in the carriage chassis that access is possible only when the child is no longer in the insert. This equally applies to a doll or an object. The actuating element is accessible for functional control only after upward pivotation or taking off the seat part of an insert or by removal of the insert from the mounts in the chassis frame. If a Bowden pull, which as known consists of a core and a casing arranged in tension between two fixed points so that the core is displaceable within the casing, is used as pull device then it is evident that unintended actuation is not possible. This equally applies when, for example, pull cables, which are not able to be gripped by hand, are provided in order to trigger lifting movement. The most diverse possibilities of concealed guidance of the force receiving means will be evident to the expert. However, in all cases the end of the pulling or lifting device has to be effective at one part of the stabilising rod or at both parts so as to enable lifting thereof.

For erection of the chassis the two parts of the stabilising rod are automatically drawn outwardly so that the toggle joint is drawn down again into the horizontal or into an aligned position with respect to the connecting ends of the parts of the stabilising rod. If the lifting device comprises a linkage then it is also possible to bring this into the extended state by action of force on a part of the divided stabilising rod. In that case, the support struts are pivoted outwardly relative to the chassis posts.

In a further embodiment it is provided that the actuating element is mounted on a joint mount at at least one of the chassis posts at which in addition a joint for one of the support struts is provided. The joint mounts can also be a joint plate at which a plurality of joints is mounted, for example also a joint for the pivotably movable attachment of the push bar.

The actuating element can be a button-shaped actuating element which, for example, is fastened to a core of a Bowden pull so as to be able to be displaced not only in one direction, but also in the other direction. However, it is also possible to construct the actuating element as a yoke element which at both sides at the joint mounts at the chassis posts or the support struts can be brought in the region of the joints into at least one lower and upper pivot position and acts directly or indirectly on a lifting linkage, a cable pull or a chain pull, which raises the at least one part of the stabilising rod when the actuating element is raised for unlocking and, after or during return of the actuating element, the at least one part of the stabilising rod is lowerable into the lower setting, wherein in the unlocked setting the parts can be raised at least until a relative collapsing of the chassis posts and the support struts takes place.

The use of a yoke additionally has the advantage that the seat part or middle part of the insert or the insert by a part can exert thereon a pressing force when the yoke is moved downwardly or is brought into the lower setting, which can also be a horizontal setting. If rods, thus rigid coupling elements, are connected with the yoke so as to exert a force on the parts of the stabilising rod to which they are pivoted then it is thereby ensured that the stabilising rod remains in the horizontal setting as long as the insert rests on the yoke. Only when the insert is removed or shifted is upward pivotation possible. This can also be effected in that the seat part is arranged within a frame construction of the insert to be able to erected, for example is pivotable about a front axis, so that after lifting of the seat part the yoke can be pulled in order to cancel the provided locking by the stabilising rod or rods and to move the toggle joints upwardly.

It is obviously also possible to mount, instead of a yoke, levers at one side on the joint mounts. These can be provided at one side, thus only on one joint mount, or, however, at both sides and independently of one another operate a respective stabilising rod or, however, even be coupled. Equally, it is possible to construct the actuating element as a pivot lever, in which case the pivot lever can only be moved upwardly when the insert is removed or, however, the seat part of the insert is folded up. Pressing and drawing elements or a button, which are respectively mounted on a joint mount, can also be provided as actuating elements. A Bowden pull, a chain pull or cable pull can then be connected therewith so as to produce the movement transformation in desired manner on a part of the stabilising rod when the chassis is to be collapsed.

If the chassis comprises two stabilising rods arranged in parallel or mirror image it is recommended to provide a connecting element between the two parts, on which the lifting device, cable pull, chain pull or also the rod of a coupling linkage acts. The corresponding elements are attached or pivoted to the bridge element so that the toggle joints can be raised by way of a single drive in order to enable collapse of the chassis in desired manner without further securing elements having to be operated.

In the case of use of a Bowden pull it is possible to support the casing thereof on a holder at a bridge element and to fasten the core to an entraining eccentric or to a lever of an angle lever, which is rotatably mounted on a bridge element, in such a way that a tension force is exerted on the pivotable part of the stabilising rod by way of the entraining rod, which is attached to the upwardly projecting arm, a cable or a chain. The introduction of force takes place on actuation of the actuating element so that by way of this the toggle joints can be lifted in order to collapse the chassis.

If the carriage chassis does not comprise bridge elements and also is to be foldable together in width then it is necessary to provide at the ends of the push bar individual push grips or a connecting push yoke foldable in the middle, so that after collapse of the front and rear wheels by pivotation of the chassis posts and the support struts the adjacent sides are also movable towards one another. If, on the other hand, a closed push yoke is provided, then the front and rear wheels each maintain a spacing. This can be secured by bridge elements between the chassis posts and the support struts as well as by connecting axles for the front or rear wheels or other mounts for the wheel arrangements.

In a further embodiment it is provided that if the push bars are similarly foldably pivoted to the joint mounts or to the support struts or the chassis posts, for example can be pivoted downwardly, automatic locking takes place when the carriage chassis is erected. If, thereagainst, folding is initiated, this locking should also be able to be released so as to be able to downwardly pivot the push bars provided in prolongation of the chassis posts. In order to be able to manage this, in a further embodiment a securing hook is provided which is actuable by the pivoting chassis post and is pivoted into a detent recess in the provided push bar or in a plate thereat when the push bar and carriage chassis are erected. The securing hook is attached to a rotary rod having an entrainer, which is operatively connected with an eccentric at a bearing strap of the chassis post in such a way that when the chassis post is folded in the rotary rod is pivoted, by movement transformation, until the securing hook slides out of the detent recess and frees the push bar for lowering.

Since the chassis posts can also be constructed to be bent, thus virtually an oval structure can be provided or, however, the structure can be rectilinear and can have a curved or wavy shape in longitudinal direction, in every case it has to be ensured that the chassis posts are arranged at such a spacing from one another that the insert is movable without obstruction not only into the upper position, but also into the lower position.

BRIEF DESCRIPTION OF THE DRAWINGS

The invention is explained in more detail in the following by way of the embodiments illustrated in the drawings, in which.

DETAILED DESCRIPTION OF THE INVENTION

Figure 1:
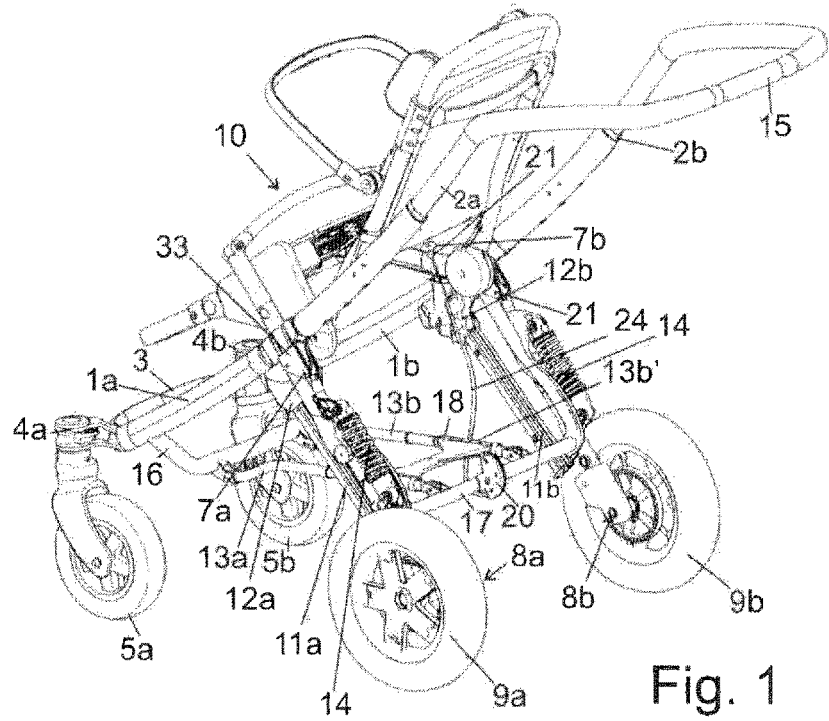
FIG. 1 shows, in an isometric illustration, a baby carriage chassis in the erected state with a seat insert and a locking device, which is constructed in accordance with the invention, for the baby carriage with an actuating element provided below the baby carriage insert.
Figure 2:
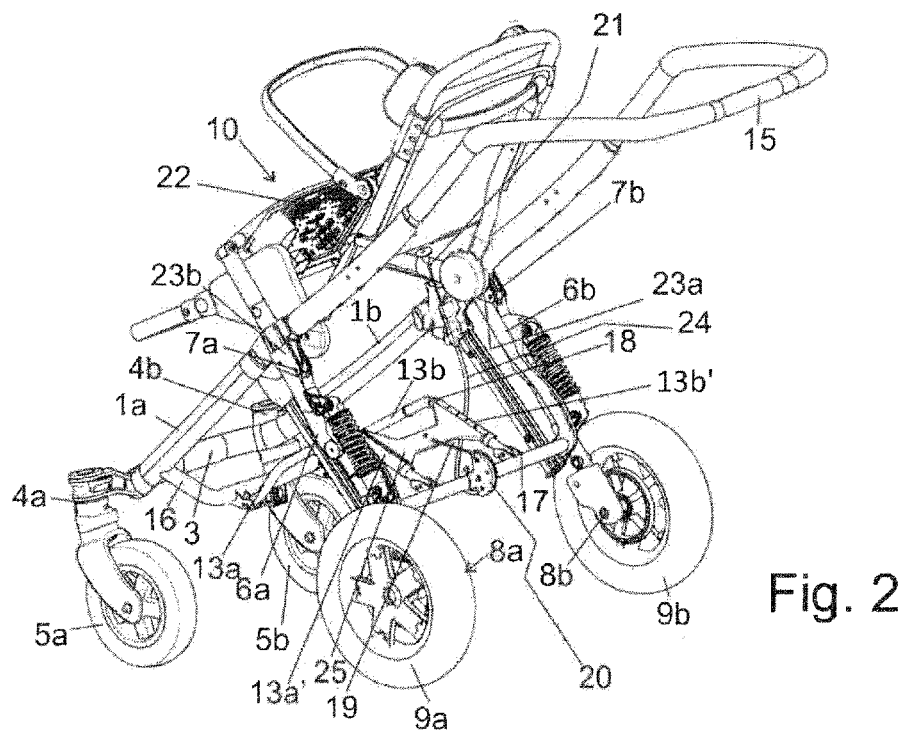
FIG. 2 shows the baby carriage chassis, which is illustrated in FIG. 1, with partly pivoted chassis post relative to the support struts.

The baby carriage chassis illustrated in FIGS. 1 and 2 substantially consists of the chassis posts 1a, 1b, which are arranged to extend, in the erected state of the baby carriage chassis, to rise at an inclination in rearward direction from the bottom at the front. Push bars 2a, 2b are provided in prolongation with respect to the chassis posts 1a and 1b, which can be constructed to be continuous or divided by a joint, and are mounted in the upper sections of the chassis posts 1a, 1b to be withdrawable. The two push bars 2a, 2b are connected together by way of a push yoke 15. The lower ends of the chassis posts 1a, 1b are connected together by way of a bridge member 3 and in addition have front wheel arrangements 4a, 4b consisting of vertical bearings in each of which a bearing pin with a respective fork-shaped receptacle is pivotably mounted, the front wheels 5a and 5b being mounted in the receptacles. Pivot bearings 7a and 7b are fastened to the chassis posts 1a and 1b. Support struts 6a and 6b are attached to these pivot bearings 7a, 7b to be pivotable forwardly in the direction of the chassis posts 1a, 1b. The support struts 6a, 6b are longitudinally divided and each have a joint formed approximately in the centre and a damping spring 14 bridging over the joint. These bridging-over damping springs 14, which are fastened to the limbs of the support struts 6a, 6b, produce damping of shock loading during travel over ground with cobbles or other rough surface. The lower ends of the upper limbs of the support struts 6a, 6b, which project beyond the pivot axis at the lower limb, are connected together by way of a bridge element 17 and have mounts 8a, 8b for the rear wheels 9a and 9b.

Of significance in terms of the invention is the mounting of guide rails 11a, 11b, which are respectively attached at the lower ends to the support struts 6a, 6b and are fastened in such a way at the upper ends to a chassis post to be pivotably movable and displaceable in upward direction that when the support struts 6a, 6b are pivoted forwardly in the direction of the lower sections of the chassis posts 1a, 1b the guide rails 11a, 11b can similarly be pivoted forwardly, which is necessary for collapsing the carriage chassis. At the upper end the guide rail can also be fastened to the respective support strut 6a, 6b. Holders 12a and 12b are arranged on the guide rails 11a, 11b to be longitudinally displaceable. These holders are provided with locking means which co-operate with the guide rails 11a and 11b, for example this can be a detent pin which is actuable by way of a button and which detents in an aperture in the guide rail under spring action and can be released from detenting by actuation of a control knob. Such apertures are provided at both the upper ends and the lower ends at the guide rails 11a and 11b for displacing and fixing the holders 12a and 12b.

The figures additionally show that an actuating element 21 is fixed at at least one of the holders 12a and 12b, which are mounted on the guide rails 11a and 11b to be displaceable, and in particular so that it ends below the seat part 22 of a seat insert 10, which is illustrated in both figures folded up, namely in the uppermost position of the seat insert 10. In FIG. 1 the parts 13a and 13b or 13a' and 13b' are shown extended by the toggle joints 18, i.e. the carriage chassis is erected. When the actuating element 21 is pulled, the core of the Bowden pull 24 is pulled and the pulling movement transferred by a deflector 20, which is fixedly mounted on the bridge element 17 and which encloses and guides the casing of the Bowden pull, to the connecting element 25 and thus to the corresponding part 13a', 13b' of the stabilising rods 13a, 13b.

If the core of the Bowden pull is fastened to a rotatably mounted entraining eccentric 20 and if the casing end is supported, the entraining eccentric 20 rotatably arranged on the rear bridge element 17 can be pivoted by means of the Bowden pull. Provided for this purpose is a holder which is not visible and on which the casing of the Bowden pull is supported so that the relative movement of the entraining eccentric 20 is made possible. The entraining eccentric 20 rotates through a defined angle and in that case exerts on the pull cable 19 a pulling force which is exerted on the connecting element 25, which connects the two parts 13a' and 13b' of the stabilising rods 13a and 13b. It will be evident that then—as apparent from FIG. 2—the toggle joints 18 are lifted upwardly and the support struts 6a, 6b automatically move in the direction of the chassis posts 1a, 1b or these in the direction of the support struts 6a, 6b.

The stabilising rods 13a, 13b serve as securing rods and are also used for the purpose of stabilising the chassis in the erected state and produce, when required, by lifting a collapse of the carriage chassis. The two stabilising rods 13a, 13b are pivoted at the front side to a bridge element 16 by way of joints and at the rear side to the bridge element 17, which connects the two lateral ends of the elongated upper limbs of the divided support struts 6a and 6b. The divided support struts 6a, 6b are provided with damping elements 14, which damp travel shocks to the chassis. Due to the fact that the actuating element 21 is fastened to a holder 12b adjustable in height, actuation is also possible when the insert 10 is displaced into the lower position, as previously described, as soon as the seat part 22 is folded up and the actuating element 21 is pulled.

Figure 3:
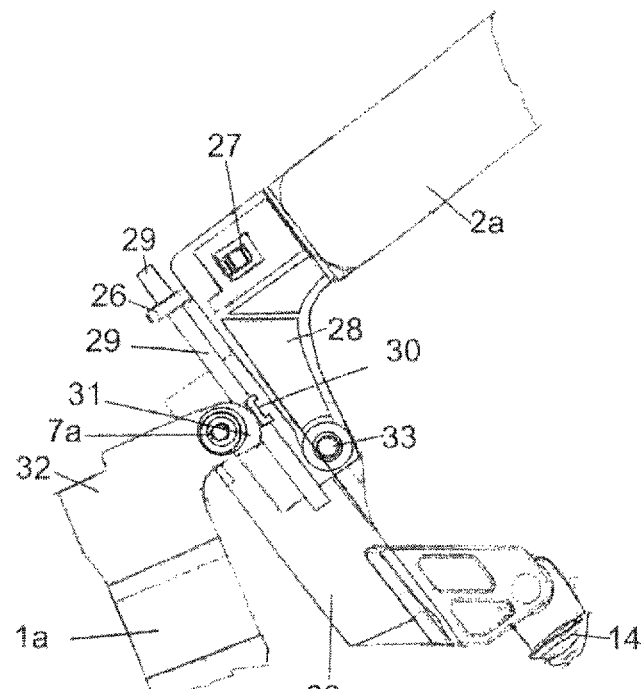
FIG. 3 shows a side view of a joint mount with pivotably mounted chassis post of a push bar and a support strut with locking means for the push bar and FIG. 4 shows a front view of the joint mount with a securing hook for fixing the push bar in the erected position.
Figure 4:
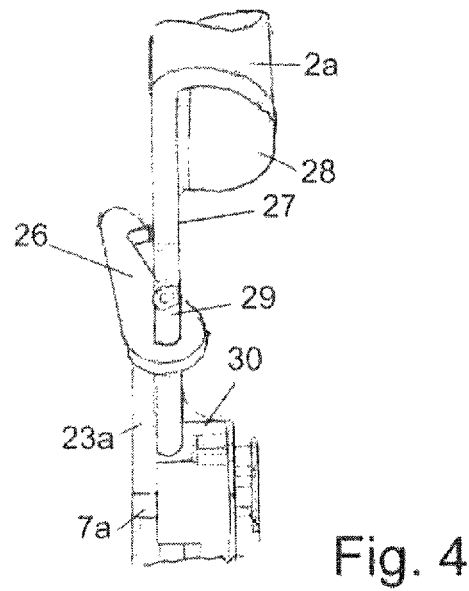

A joint mount 23a is illustrated in FIG. 3 in a side view, to which not only a chassis post 1a, but also the push bar 2a are attached by way of joints 7a and 33 to be capable of pivot movement. In addition, a support strut is mounted at the lower side on the joint mount 23a, which, however, for the sake of simplicity is not illustrated. Moreover, a bearing block is illustrated, at which the damping spring 14 is pivoted. The feature of this joint mount is that a rotary rod 29 is rotatably mounted thereon, at which at the upper end there is disposed a securing hook 26 clearly visible in the perspective illustration in FIG. 4. This securing hook 26 is pivoted by its front hook end into a detent recess 27 in a plate 28, which is a component of the joint of the push rod 2a. It will be evident that in the erected position the push bar 2a is mounted by way of that at the joint mount 23a and thus the assembly is secured. In addition, disposed at the rotary rod 29 is an entrainer 30 which protrudes tangentially and co-operates with the outer side of an eccentric 31, which is integrally formed at a bearing strap 32 to which the chassis post 1a is attached. This eccentric 31 produces, on pivotation of the bearing strap 32 into the illustrated position, rotation of the rotary rod 29, wherein at the some time the securing hook 26 slides out of the detent recess 27 and adopts the position illustrated in FIG. 4 so that the push bar 2a can be pivoted downwardly. FIG. 4 additionally shows an end view of the connecting location in the region of the joint 7a. Through the coupling, the push bar 2a is also pivoted in company with pivotation of the chassis post 1a.

A seat insert 10, which can be brought into the upper position illustrated in FIG. 1 and according to FIG. 2 can also be lowered into the lower position, is fastened to the holders 12a and 12b, whereby the centre of gravity of the seat insert 10 with the child sitting therein displaces from the front at the top in rearward direction downwardly, in which case the centre of gravity always remains between the two front wheels 5a and 5b as well as the rear wheels 9a and 9b, whereby increased security against tipping of the chassis is given even when there is rapid movement around a bend. The remaining components of the chassis are not described in more detail, since they do not have any relevance to the invention.

REFERENCE NUMERAL LIST 1a chassis post
1b chassis post
2a push bar
2b push bar
3 bridge member
4a front wheel arrangement
4b front wheel arrangement
5a front wheel
5b front wheel
6a support strut
6b support strut
7a joint
7b joint
8a bearing
8b bearing
9a rear wheel
9b rear wheel
10 seat insert
11a guide rail
11b guide rail
12a holder
12b holder
13a stabilising rod
13b stabilising rod
13a' part of the stabilising rod
13b' part of the stabilising rod
14 damping spring
15 push yoke
16 bridge element
17 bridge element
18 toggle joint
19 adjusting device (pull cable)
20 deflector/entraining eccentric
21 actuating element
22 seat part
23a joint mount
23b joint mount
24 Bowden pull
25 connecting element
26 securing hook
27 detent recess
28 plate
29 rotary bearing
30 entrainer
31 eccentric
32 bearing strap
33 joint

The invention claimed is:

1. A collapsible baby carriage or doll's pram chassis, comprising at least two lateral chassis posts, which in the erected state extend at an inclination from the bottom at the front rearwardly in upward direction, with push bars provided thereat at an upper side in prolongation and a front wheel arrangement, which is provided at the lower ends or at a bridge part connecting these, with front wheels, two lateral support struts, which are pivotably attached to the at least two chassis posts at a spacing from the lower ends thereof each by way of a respective joint and which have bearings for rear wheels at their lower ends, these ends being offset rearwardly relative to the pivot points, and a seat insert or lying-down insert arranged in the chassis, wherein the at least two chassis posts and the support struts are arranged to be pivotable relative to one another by way of a respective joint and at least one stabilising rod is pivotably provided between the at least two chassis posts and the support struts or at bridge elements respectively connecting these, wherein the stabilising rod is constructed as a securing rod and is divided by a toggle joint, which folds when the at least two chassis posts and the support struts are led together and which in the extended state forms erection securing means of the chassis frame, an adjusting device is coupled by at least a part of the at least one stabilising rod with an actuating element, which is arranged in the carriage chassis below the insert and by which the corresponding part of the stabilising rod can at least be raised by the toggle joint, the actuating element is so arranged below the insert that it is accessible for functional control only after upward pivotation of a seat part of the insert or by removal of the insert, and wherein the actuating element is a yoke element, which at both ends at the joint mounts at the at least two chassis posts or the support struts in the region of the joints can be brought into at least one lower and upper pivot position and acts directly or indirectly on a lifting linkage, a cable pull or chain pull, which raises at least a part of the stabilising rod when the actuating element is lifted for unlocking and, after or during return of the actuating element, the at least one part of the stabilising rod can be lowered into the lower setting, wherein in the unlocked setting the parts can be raised at least to such an extent that a relative folding together of the chassis posts and the support struts is possible, or the actuating element is a pivot lever, a push/pull element or a button and mounted on one of the joint mounts, wherein a Bowden pull, chain pull or cable pull is connected therewith and wherein the Bowden pull, chain pull or cable pull is led upwardly from below to run around a stationary entraining eccentric at a bridge element of the support struts or is attached to a rotatably mounted eccentric disc at the end protruding at the lower side, whilst the upwardly protruding section is connected by way of a connecting element with the part, which is to be moved, of the stabilising rod.

2. The collapsible baby carriage or doll's pram chassis according to claim 1, wherein the actuating element is mounted on a joint mount at at least one of the at least two chassis posts, at which in addition a joint for one of the support struts is provided.

3. The collapsible baby carriage or doll's pram chassis according to claim 2, wherein two stabilising rods are arranged in parallel or in mirror image, which are connected together by way of a connecting element, and that the actuating element or the adjusting device is coupled with the connecting element, wherein the connecting element is attached to the two rear parts of the stabilising rods.

4. The collapsible baby carriage or doll's pram chassis according to claim 1, wherein the seat underside of the insert presses on the actuating element or a holding-down element attached thereto engages on the actuating element.

5. The collapsible baby carriage or doll's pram chassis according to claim 4, wherein two stabilising rods are arranged in parallel or in mirror image, which are connected together by way of a connecting element, and that the actuating element or the adjusting device is coupled with the connecting element, wherein the connecting element is attached to the two rear parts of the stabilising rods.

6. The collapsible baby carriage or doll's pram chassis according to claim 1, wherein the lifting linkage comprises rigid elements which produce pressing-down of the parts of the stabilising rods when the actuating element is pressed down.

7. The collapsible baby carriage or doll's pram chassis according to claim 6, wherein two stabilising rods are arranged in parallel or in mirror image, which are connected together by way of a connecting element, and that the actuating element or the adjusting device is coupled with the connecting element, wherein the connecting element is attached to the two rear parts of the stabilising rods.

8. The collapsible baby carriage or doll's pram chassis according to claim 1, wherein the Bowden pull comprises a holder supported on a bridge element and actuates an entraining eccentric or an angle lever, which is rotatably mounted on the bridge element and is attached to the upwardly protruding arm thereof for an entrainer rod, a cable or a chain, which on actuation of the actuating element introduces a tension force in the region of the toggle joint at the pivotable part of the stabilising rod.

9. The collapsible baby carriage or doll's pram chassis according to claim 8, wherein two stabilising rods are arranged in parallel or in mirror image, which are connected together by way of a connecting element, and that the actuating element or the adjusting device is coupled with the connecting element, wherein the connecting element is attached to the two rear parts of the stabilising rods.

10. The collapsible baby carriage or doll's pram chassis according to claim 1, wherein two stabilising rods are arranged in parallel or in mirror image, which are connected together by way of a connecting element, and that the actuating element or the adjusting device is coupled with the connecting element, wherein the connecting element is attached to the two rear parts of the stabilising rods.

11. The collapsible baby carriage or doll's pram chassis according to claim 10, wherein two stabilising rods are arranged in parallel or in mirror image, which are connected together by way of a connecting element, and that the actuating element or the adjusting device is coupled with the connecting element, wherein the connecting element is attached to the two rear parts of the stabilising rods.

12. The collapsible baby carriage or doll's pram chassis according to claim 1, wherein an adjusting device with rigid elements, particularly rods, is provided between the actuating element and the pivotable part of the stabilising rod, which rigid elements on return of the actuating element to the locking setting urge the pivotable parts into the locking position when the carriage chassis with the at least two chassis posts and the support struts is erected.

13. The collapsible baby carriage or doll's pram chassis according to claim 1, wherein push bars protruding above the insert are mounted at the at least two chassis posts and that individual push grips or a connecting push yoke, which is foldable in the middle or non-foldable, is or are mounted at the ends of the push bars.

14. The collapsible baby carriage or doll's pram chassis according to claim 13, wherein a securing hook is provided, which is actuable by the at least two chassis posts and pivoted into a detent recess in the provided push bar or in a plate thereat when the push bar and carriage chassis are erected, the securing hook being attached to a rotary rod comprising an entrainer which is so operatively connected with an eccentric at a bearing strap of the at least two chassis posts that, when the at least two chassis posts are folded in, the rotary bar is pivoted by movement transformation until the securing hook slides out of the detent recess and frees the push bar for lowering.

15. The collapsible baby carriage or doll's pram chassis according to claim 1, wherein the at least two chassis posts are arranged at such a spacing from one another that the insert is movable without hindrance not only into the upper position, but also into the lower position.

16. The collapsible baby carriage or doll's pram chassis according to claim 1, wherein the support struts are constructed as guide rails, or guide rails, which extend substantially parallel thereto and are mounted on the support struts and/or on the at least two chassis posts and on which holders for fixing the seat or lying-down insert are slidably mounted to be adjustable in height and lockable at least in an upper displacement position and a lower displacement position, wherein the centre of gravity of the insert in the upper position is displaced forwardly relative to that in the lower position and wherein the actuating element is fastened to one or both of the holders.

* * * * *